Nov. 26, 1963 W. SHRINER 3,112,400
NUCLEAR RADIATION DETECTION DEVICE
Filed Dec. 5, 1961
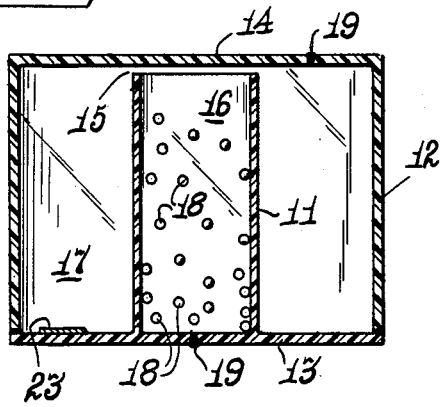
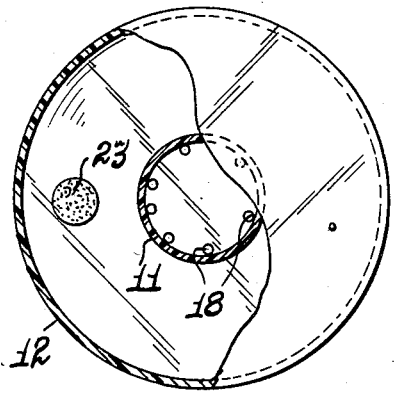
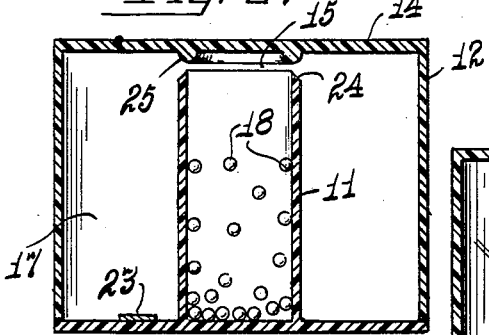
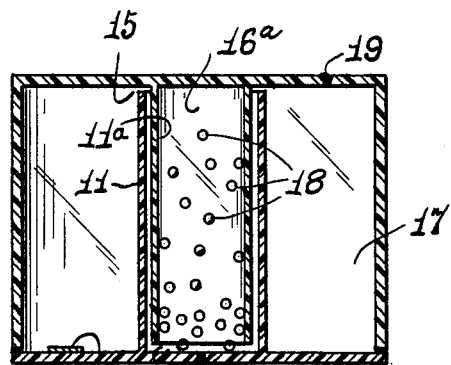
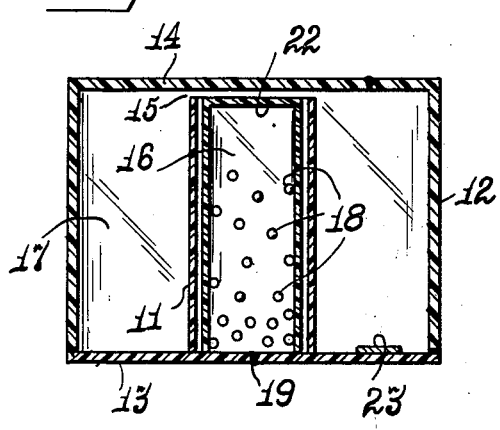
INVENTOR.
WALTER SHRINER
BY
Attorney

United States Patent Office 3,112,400
Patented Nov. 26, 1963

3,112,400
NUCLEAR RADIATION DETECTION DEVICE
Walter Shriner, 1133 S. 2nd St., Springfield, Ill.
Filed Dec. 5, 1961, Ser. No. 157,211
7 Claims. (Cl. 250—83.3)

This application is a continuation-in-part of my application Serial No. 64,168, filed October 21, 1960, now Patent No. 3,093,737, issued June 13, 1963.

The invention relates to instruments for visually indicating the presence and relative intensity of ionizing radiation and is more particularly concerned with the novel construction and assembly of such a device requiring no external source of electric current and one that is shielded from external electrostatic influence and hence is maintained in a condition of use at all times.

Numerous devices have been proposed for the detection of ionizing radiation. Such devices as are known to applicant are complicated in structure, expensive to manufacture, and more important, they fail to embody any structure that renders them insensitive to external electrostatic influence. Devices that are subjected to external electrostatic influence are not capable of being maintained readied for service at all times but must be readied each time use of the device is deemed necessary.

Also, some known devices are of a nature that incorporate means capable of changing color in proportion to the amount of radiation to which they are subjected or embody mechanical devices for recording the degree of radiation, and are either too costly to manufacture and maintain serviceable or are not suited for prolonged usage either because they require periodic recharging or are not reusable.

The device disclosed in several embodiments is easy to manufacture, is ruggedly constructed, is entirely self-contained, is portable, occupies but a minimum of space, requires no outside current for purposes of recharging and is capable of reuse so long as its physical structure is not damaged or destroyed. It also has the advantage of affording novel means to shield the indicating components thereof against external electrostatic influence and consequently the device is maintained in a state of charged readiness at all times and it is therefore an object of the invention to provide a device having such characteristics.

More particularly, the device, which may be embodied in various physical forms, is comprised essentially of an inner chamber defined by an electrically non-conductive inner wall and which is insulated from atmospheric and surrounding electrostatic influences by a wall of dielectric material spaced from and surrounding said inner wall and having end walls sealed thereon so as to define an outer chamber which confines an insulating body of ionizable gaseous medium such as air and/or a hydrocarbon gas not miscible with water, that is in flow communication with the inner chamber.

The inner and outer walls are elongated substantially cylindrical in shape and they, or at least a portion thereof, are transparent so as to afford ready visibility of free floating elements or pellets of like or different size and weight and all comprised of a material suitable for retaining an electrostatic charge and which are confined within the inner chamber.

In use, the device is charged by being shaken or otherwise agitated in a manner to distribute the elements around the interior of the inner wall or ion chamber. Such agitation develops a static charge on both surfaces of the wall of the ion chamber and a static charge of opposite polarity on the elements. This causes the elements to repel one another and to be attracted to and adhere suspended in a random pattern, on the inside surface of said inner wall. The resulting capacitor will retain its charge irrespective of the presence or absence of external electrostatic influence because it is adequately insulated by the surrounding body of ionizable medium. The charged device is then positioned with the axis of its cylindrical walls vertically. However, should external ionizing radiation be present, the electrostatic charge on the inner wall and elements will be reduced in proportion to the quanity of the ionizing radiation which has penetrated the body of ionizable medium and reached said inner wall and should the charge of any one or more of said elements be reduced to null by such ionizing radiation, such element or elements will drop to the bottom of the vertically disposed ion chamber. The degree to which such elements are attracted to the wall of the ion chamber is an indication of the electrostatic charge developed and of the intensity of the ionizing radiation present in surrounding atmosphere. Since the device is transparent, at least in part, the number of elements attracted to the wall and their relative positions of elevation thereon can be ascertained at all times.

It is therefore another object of the invention to provide a novel instrument for detecting the presence of ionizing radiation and its intensity.

Other and further objects and advantages of the invention will become apparent to those skilled in the art from the following detailed description of the annexed drawings, which disclose exemplary embodiments of the invention.

In the drawings:

FIG. 1 is a vertical longitudinal sectional view of an exemplary embodiment of the invention.

FIG. 2 is a top plan view of the embodiment shown in FIG. 1, partially broken away.

FIG. 3 is a sectional view similar to FIG. 1, showing a modified form of construction.

FIG. 4 is a sectional view similar to FIG. 1, showing another embodiment of the invention.

FIG. 5 is a view similar to FIG. 1, but showing another modification.

Referring to the accompanying drawings, and particularly to the exemplary embodiment shown in FIGS. 1 and 2, the ionizing radiation detection device illustrated comprises concentric inner and outer cylindrical walls 11 and 12 and end walls 13 and 14. Although various modes of manufacture and assembly may suggest themselves, applicant has for convenience of manufacture fabricated the assembly from two sections molded or otherwise formed of suitable dielectric material, such as for example, transparent polystyrene or fabricated acrylic plastic, which sections are nested one within the other and the hermetically sealed to provide an air-tight enclosure. More specifically, the inner cylindrical wall 11 may be integral with bottom end wall 13, whereas the outer wall 12 may be integral with the top end wall 14. When assembled, the free edge of outer wall 12 is adhesively bonded permanently to the peripheral margin of bottom wall 13 as by the use of suitable plastic adhesive or by fusing, to provide a hermetic seal at the joint. The outer wall 12 has a depth that is but slightly greater than the depth of inner wall 11 so that when the sections are assembled, and hermetically joined in the manner shown, the top free edge of the inner wall 11 is spaced slightly from the opposed bottom surface of the top end wall 14 to provide a circumferential gap 15 that functions to maintain an inner or ion chamber 16, surrounded by wall 11, in atmospheric communication with an outer or insulating chamber 17 defined between the inner and outer walls 11 and 12 respectively. Preferably, the relative diameters of inner and outer walls 11 and 12 are proportioned about three to one. For example, the inner wall may have a thickness of about 1/32 inch and an inside diameter of about 7/8 inch; whereas the outer wall may have a thickness of about 1/8 inch and an inside diameter of about 3 inches.

Proportionate dimensioning of these walls is necessary in order to afford adequate shielding of the inner or ion chamber 16 against the influence of electrostatic charges in the atmosphere surrounding the device for reasons to be explained presently.

Prior to assembly of the two units, a plurality of elements such as pellets 18, are placed within ion chamber 16. These pellets preferably are colored for purposes of visibility and may vary in size and shape but in the presently disclosed embodiment they preferably are not greater than 1/8 inch in diameter and they are comprised of any dielectric material such as acrylic or expanded polystyrene, having the requisite property of acquiring an electrostatic charge when agitated.

The device functions properly, as hereinafter described, when the ionizable gaseous medium in the sealed unit is air and/or hydrocarbon gas not miscible with water. In order to control such atmospheric conditions the end walls, for example, may each be initially provided with a vent orifice to permit dehydration of the atmospheric contents and then hermetically sealed, as at 19.

The relationship of the parts and their functions can best be described in connection with the description of the operation which follows:

The device is charged electrostatically by shaking or otherwise agitating same in a manner to cause the pellets to scatter throughout the interior of the inner or ion chamber 16. Such motion causes a triboelectric charge to be separated in the chamber and this causes the pellets to be repelled one from the other and to adhere in a random fashion to the internal vertical wall of ion chamber 16, suspended against the force of gravity. This adherence arises because of the generation on both the inner and outer surfaces of the ion chamber wall 11 of a static charge. Owing to the novel construction herein-disclosed, the presence of this charge is not affected in any manner by the presence in surrounding atmosphere of any disturbing electrostatic influence, the surrounding confined ionizable medium affording an insulation barrier to prevent such influence. Thus the device is maintained in a condition of readiness at all times, the pellets remaining suspended until subjected to the neutralizing effect resulting from exposure to ion radiation only.

The number of pellets displaced by ion radiation is indicative of the strength of the ion radiation, thus, if the amount of ionizing radiation is nominal there is only partial neutralization of all of the pellets and the gravitational pull on the pellets will cause them to slide downwardly into positions representative of the strength of the radiation. When subjected to a given maximum amount of ionizing radiation, all of the pellets will be neutralized and will fall to the bottom of ion chamber 16.

In order to adapt the instrument to register several different degrees of radiation without recharging by agitating, the pellets may be of more than one size and/or weight so as to render each group responsive to different degrees of ionizing radiation and gravitational pull. In such instances, pellets of different size and/or weight can be colored differently to facilitate ease of observation.

Referring now to the exemplary form of instrument shown in FIG. 3 the ion chamber 16a is provided with two cylindrical walls 11, 11a, the latter being formed integral with top end wall 14 and telescoped into upstanding wall 11. The wall 11a will terminate short of the bottom wall to provide a gap 21 to permit free flow of the ionizable gaseous medium between the inner and outer chambers thereof. A double wall inner chamber of this character increases the inductive capacitance of the device and enhances the resistance to reduction of the electrostatic charge in the ion chamber arising from external electrostatic effect.

A similar structure is depicted in FIG. 4, but in this instance the double wall is provided by insertion of a capsule 22, open at one end, into the inner chamber 16. The overall length of the capsule is slightly less than the distance between the two end walls 13, 14 so as to permit it to fit loosely therebetween and allow for the free exchange of confined medium between the inner and outer chambers.

The FIG. 5 structure is substantially like that disclosed in FIG. 1, except that in this embodiment the upper free edge 24 of the inner or ion chamber wall 11 is formed at an angle. Preferably, the angle of inclination is outwardly-downwardly substantially as shown. The bottom face of the top wall 14 has an annulus or rib 25 thereon in opposition to and spaced from the wall edge 24 to maintain the requisite gap 15 for free interchange of ionizable medium between the inner and outer chambers.

In order to provide visual means for indicating that the hermetic seal of the device has been broken, the device is provided with a disk 23 of cobalt chloride or its equivalent which functions to change color when the ionizable medium within the chambers is contaminated.

While I have shown certain preferred embodiments of my invention and described them more or less precisely as to details, it is to be understood that the invention is not to be limited thereby, as changes may be made in the arrangement and proportion of parts and equivalents may be substituted without departing from the spirit and scope of the invention.

What I claim and desire to secure by Letters Patent of the United States is:

1. A device for visually indicating the presence and intensity of ionizing radiation comprising, a substantally cylindrical transparent dielectric wall, dielectric end walls sealing the ends of said cylindrical wall, a substantially cylindrical inner wall substantially coextensive with and concentrically spaced from the first named cylindrical wall, and said inner wall being integral at one end with one end wall and terminating short of the other end wall to define an annular gap, said walls defining an inner chamber and a surrounding outer chamber both having an ionizing gaseous medium therein and being in flow communication one with the other through said annular gap, at least one small dielectric element within the inner chamber, said element and inner wall being capable of sustaining an electrostatic charge whereby said element is attracted to said inner wall, said chargeable element and inner wall being shielded from external electrostatic influence by the ionizable medium contained in the housing.

2. The device recited in claim 1, in which a plurality of elements are contained in the inner chamber.

3. The device recited in claim 1, in which the element is a pellet.

4. The device recited in claim 1, in which means is provided within the sealed container to register leakage thereof.

5. The device recited in claim 1, in which a second dielectric cylindrical wall is telescoped within the inner dielectric wall.

6. A device for visually indicating the presence of ionizing radiation comprising a sealed housing, an ionizable medium confined in said housing, an inner wall defining an inner chamber and an outer chamber in said housing, an annular passageway connecting said inner chamber with the outer chamber for the free interexchange of ionizable medium between said chambers, said passageway being defined on one side by an edge of the inner wall and on its other side by a circular rib formed integral with a wall of said housing and arranged concentric with said inner wall, and a plurality of electrostatically chargeable elements contained within the inner chamber, said elements and inner wall being capable of sustaining an electrostatic charge, said charge causing said elements to be attracted to said inner wall, and said chargeable elements and inner wall being shielded from external electrostatic influence by the ionizable medium contained in said housing.

7. The device recited in claim 6, in which the said edge of said inner wall is inclined outwardly radially in a direction away from the rib.

References Cited in the file of this patent
UNITED STATES PATENTS

| | | |
|---|---|---|
| 2,731,568 | Failla | Jan. 17, 1956 |
| 2,741,706 | Futterknecht | Apr. 10, 1956 |
| 2,805,345 | Warmoltz et al. | Sept. 3, 1957 |